(12) United States Patent
Fu

(10) Patent No.: US 11,181,710 B2
(45) Date of Patent: Nov. 23, 2021

(54) LENS DRIVING DEVICE, CAMERA DEVICE AND ELECTRONIC APPARATUS

(71) Applicant: New Shicoh Motor Co., LTD, Zhejiang (CN)

(72) Inventor: Xuepeng Fu, Yamato (JP)

(73) Assignee: New Shicoh Motor Co., LTD, Zhejiang (CN)

( * ) Notice: Subject to any disclaimer, the term of this patent is extended or adjusted under 35 U.S.C. 154(b) by 0 days.

(21) Appl. No.: 16/845,647

(22) Filed: Apr. 10, 2020

(65) Prior Publication Data

US 2020/0333548 A1 Oct. 22, 2020

(30) Foreign Application Priority Data

Apr. 19, 2019 (CN) .......................... 201910319897.7

(51) Int. Cl.
*G02B 7/02* (2021.01)
*G02B 7/00* (2021.01)

(52) U.S. Cl.
CPC ................ *G02B 7/02* (2013.01); *G02B 7/00* (2013.01); *G02B 7/021* (2013.01); *G02B 7/023* (2013.01)

(58) Field of Classification Search
CPC . G02B 7/00; G02B 7/02; G02B 7/021; G02B 7/023
USPC ........................................................ 359/824
See application file for complete search history.

(56) References Cited

U.S. PATENT DOCUMENTS

| 7,990,625 | B2 * | 8/2011 | Ke ........................ G02B 13/009 359/696 |
| 10,466,074 | B2 * | 11/2019 | Terajima ................ G01D 5/202 |
| 11,082,595 | B2 * | 8/2021 | Washio ..................... G03B 5/00 |
| 2017/0082823 | A1 | 3/2017 | Hwang et al. |
| 2017/0094187 | A1 | 3/2017 | Sharma et al. |
| 2018/0003918 | A1 * | 1/2018 | Hu ........................ H04N 5/2254 |
| 2018/0059356 | A1 * | 3/2018 | Wu .......................... G02B 7/08 |
| 2018/0100983 | A1 * | 4/2018 | Kao ......................... G02B 7/08 |
| 2018/0100984 | A1 * | 4/2018 | Wu ........................ G03B 13/36 |
| 2018/0128649 | A1 * | 5/2018 | Terajima ................ G01D 5/202 |
| 2018/0224625 | A1 * | 8/2018 | Tseng .................. H04M 1/0264 |

(Continued)

FOREIGN PATENT DOCUMENTS

| CN | 206039115 U | 3/2017 |
| CN | 107783352 A | 3/2018 |

OTHER PUBLICATIONS

Japanese Office Action dated May 31, 2021 issued in co-pending Japanese Application No. JP20-0749.

*Primary Examiner* — William R Alexander

(74) *Attorney, Agent, or Firm* — Hayes Soloway P.C.

(57) ABSTRACT

A lens driving device is disclosed that includes a first mover, a second mover and plate springs. The first mover is provided with a first through hole for accommodating a first lens body with an optical axis in a Z direction, and includes a pair of first plate-like magnets arranged parallel to each other at positions across the first through hole. The second mover is provided with a second through hole for accommodating a second lens body with an optical axis in the Z direction, and includes a pair of second plate-like magnets arranged parallel to each other at positions across the second through hole. The plate springs respectively support the first mover and the second mover movably in the Z direction. The first mover and the second mover are arranged side by side in a direction orthogonal to the Z direction.

7 Claims, 6 Drawing Sheets

(56) References Cited

U.S. PATENT DOCUMENTS

| | | | |
|---|---|---|---|
| 2018/0234629 A1* | 8/2018 | Tseng | G02B 7/021 |
| 2019/0162934 A1* | 5/2019 | Dong | H04N 5/23267 |
| 2019/0285827 A1* | 9/2019 | Wu | G03B 3/10 |
| 2019/0297235 A1* | 9/2019 | Huang | H04N 5/2254 |
| 2019/0339477 A1* | 11/2019 | Wu | G02B 27/646 |
| 2020/0116972 A1* | 4/2020 | Wu | G03B 3/10 |
| 2020/0333548 A1* | 10/2020 | Xuepeng | G02B 7/04 |
| 2021/0033946 A1* | 2/2021 | Noriyuki | H04N 5/2251 |

* cited by examiner

LENS DRIVING DEVICE, CAMERA DEVICE AND ELECTRONIC APPARATUS

CROSS-REFERENCE TO RELATED APPLICATION

This application claims the benefit of Chinese patent application CN 201910319897.7 filed on Apr. 19, 2019, the contents of which are incorporated herein by reference.

TECHNICAL FIELD

The present disclosure relates to a lens driving device, a camera device and an electronic apparatus used in electronic apparatus such as smartphones.

BACKGROUND

The practical application of a camera module with two or more lens driving devices, so called dual camera is in progress. There is a Patent Document of Chinese utility model CN206039115U (hereinafter referred to as "Patent Document 1") which discloses a technique related to the lens driving devices of the dual camera. In the lens driving device of Patent Document 1, two lens supporting bodies are arranged symmetrically in parallel, a set of magnets are provided at positions sandwiching a through hole in each lens supporting body, a coil is disposed on a frame opposite to the magnet, and the lens supporting body is guided in the optical axis direction using a ball.

However, as in the technology of Patent Document 1, when a magnet is disposed on a lens supporting body (mover) and an attempt is made to configure a lens driving device in which movers supported by normal plate springs are arranged side by side, there is a problem that the magnets respectively arranged in the two movers interfere with each other.

SUMMARY

The present disclosure is intended to solve such problem and an object of the present disclosure is to provide a lens driving device with magnets arranged in a mover, a camera device, and an electronic apparatus, so that there is a little interference of the magnets even if a configuration in which two movers arranged side by side are supported by plate springs is employed.

In order to solve the above problem, according to a first aspect of the present disclosure, there is provided a lens driving device including a first mover, a second mover and plate springs. The first mover is provided with a first through hole for accommodating a first lens body with an optical axis in a Z direction, and includes a pair of first plate-like magnets arranged parallel to each other at positions across the first through hole. The second mover is provided with a second through hole for accommodating a second lens body with an optical axis in the Z direction, and includes a pair of second plate-like magnets arranged parallel to each other at positions across the second through hole. The plate springs respectively support the first mover and the second mover movably in the Z direction. The first mover and the second mover are arranged side by side in a direction orthogonal to the Z direction. The plate-like magnets constituting the first magnet and the second magnet are respectively magnetized in the plate surface direction, and magnetization orientations thereof are reversed between a front side and a rear side in the Z direction, and the first magnet has an end surface facing the second mover.

According to a second aspect the present disclosure, there is provided a camera device including the lens driving device, the first lens body and the second lens body which are described above.

According to a third aspect of the present disclosure, there is provided an electronic apparatus including the camera device described above.

DETAILED DESCRIPTION

Figure 1:
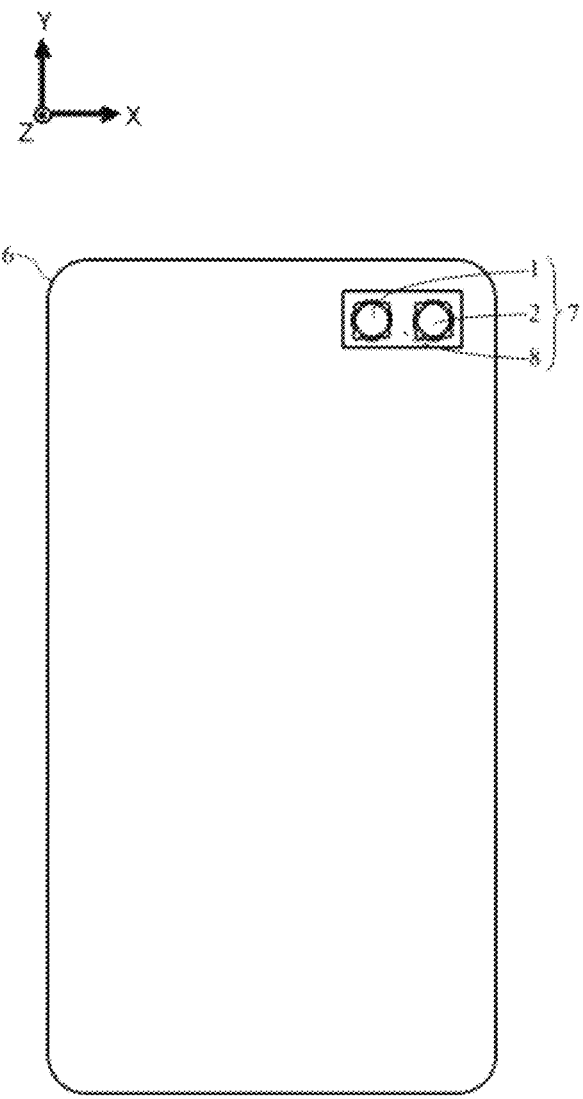
FIG. 1 is a front view of a smartphone, which is an electronic apparatus, mounted with a camera device that includes a lens driving device configured in accordance with one embodiment of the present disclosure.

Hereinafter, embodiments of the present disclosure are explained with reference to drawings. As shown in FIG. 1, the camera device 7 is mounted in the opening of the housing of the smartphone 6. The camera device 7 includes a lens driving device 8, a first lens body 1, a second lens body 2, and an image sensor (not shown) in which the light incident from a subject through the first lens body 1 and the second lens body 2 is converted to an image signal. In the camera device 7, the first lens body 1 and the second lens body 2 mounted on the lens driving device 8 are individually driven to capture an image of the subject. Hereinafter, the optical axis direction along the optical axes of the first lens body 1 and the second lens body 2 is appropriately referred to as a Z direction, one direction orthogonal to the Z direction is appropriately referred to as an X direction, and a direction orthogonal to both the Z direction and the X direction is appropriately referred to as a Y direction. Further, the subject side of the optical axes of the first lens body 1 and the second lens body 2 may be referred to as a front side, and the side on which an image sensor is provided and which is opposite to the subject may be referred to as a rear side.

The lens driving device 8 includes a first lens driving unit 91 for driving the first lens body 1, a second lens driving unit 92 for driving the second lens body 2, and a cover 90 covering the entire first lens driving unit 91 and the second lens driving unit 92. The cover 90 is a box-shaped member made of nonmagnetic material. The front plate of the cover 90 is extended in the X direction. The front plate of the cover 90 is provided with through holes 911 and 921. The through holes 911 and 921 have a shape in which four points on the outer periphery of a perfect circle are protruded outward. The through holes 911 and 921 are separated at the same distance on both sides from the center of the cover 90 in the X direction.

Two plates of the cover 90 facing each other in the X direction respectively are provided with a through hole 912 and a through hole 922, respectively. The through holes 912 and 922 are used for bonding to a first FPC81 and a second FPC82 described below to secure the strength.

One plate of the two plates of the cover 90 facing each other in the Y direction is provided with two through holes 913 and 923. The through holes 913 and 923 are used for bonding to a first frame 21 and a second frame described below to secure the strength.

The other plate of the cover 90 in the Y direction has two recess portions 915 and 925 recessed from an edge on the rear side of the plate toward the front side. A part of an external connecting terminal portion 815 of the first FPC81 and a part of a second external connecting terminal portion 825 of the second FPC82 each described later are arranged on the recess portions 915 and 925. Due to the recess portions 915 and 925, each terminal of the external connecting terminal portion 815 and each portion of the second external connecting terminal portion 825 are not in contact with the cover 90. The recess portions 915 and 925 are separated at the same distance on both sides from the center of the cover 90 in the X direction.

A first frame 21 and a second frame 22 are respectively mounted on the bottom plates 71 and 72 in the first lens driving unit 91 and the second lens driving unit 92 and accommodation spaces are formed. The first mover 11 and the second mover 12 are disposed in the accommodation spaces. A first coil 61 and a second coil 62 are attached to the first frame 21 and the second frame 22. The first mover 11 and the second mover 12 include a first lens carrier 101 for mounting the first lens body 1, a first magnet 51 mounted on the first lens carrier 10, a second lens carrier 102 for mounting the second lens body 2, and a second magnet 52 mounted on the second lens carrier 102. The first mover 11 and the second mover 12 are movably supported in Z direction by a first front side plate spring 31, a first rear side plate spring 41, a second front side plate spring 32, and a second rear side plate 42. A first FPC81 and a second FPC82 are further mounted on the first frame 21 and the second frame 22.

The configuration of each portion of the first lens driving unit 91 and the second lens driving unit 92 will be described in detail by using FIG. 3 to FIG. 7. The bottom plates 71 and 72 are substantially square plates. The bottom plates 71 and 72 are arranged in the X direction. Through holes 711 and 712 are penetrated in the centers of the bottom plates 71 and 72. A portion of the bottom plate 71 surrounding the outer periphery of the through hole 711 and a portion of the bottom plate 72 surrounding the outer periphery of the through hole 712 protrude to the front side as circular edge portions 721 and 722. There are four recess portions 713 and four recess portions 723 recessed inward on four edges of the bottom plates 71 and 72, respectively. Image sensors are fixed on the rear sides of the through holes 711 and 712 of the bottom plates 71 and 72.

The first lens carrier 101 and the second lens carrier 102 are formed in a shape in which the corner portions of the square pole body are chamfered so that an outline viewed from the Z direction becomes an octagon. A first through hole 111 and a second through hole 121 are provided in the centers of the first lens carrier 101 and the second lens carrier 102. The first through hole 111 and the second through hole 121 are designed to accommodate the first lens body 1 and the second lens body 2.

Respective portions occupying the boundaries between the chamfer portions of the corner portions of the first lens carrier 101 and the second lens carrier 102 and two end surfaces opposed in the X direction are recessed toward the through holes 111 and 112 as recess portions 113 and 123. The bottom surfaces of the recess portions 113 and 123 are parallel to the Y direction.

The outer periphery surface of a portion of the first lens carrier 101 that surrounds the first through hole 111 from both sides in the Y direction is recessed toward the side of the first through hole 111 as a recess portion 115. The outer periphery surface of a portion of the second lens carrier 102 that surrounds the second through hole 121 from both sides in the Y direction is recessed toward the side of the second through hole 121 as a recess portion 125. The bottom of each of a pair of recess portions 115 and 125, a central bottom surface parallel to the X direction, and a side bottom surface bent inward and extending from both end sides of the central bottom surface in the X direction.

The frame body 20 plays a role in holding the first mover 11 and the second mover 12. The frame body 20 includes a first frame 21 and a second frame 22 in which four plates are formed in a square shape. The first frame 21 and the second frame 22 of the frame body 20 are placed on and fixed to the bottom plates 71 and 72 and arranged in the X direction, and the frame body 20 has a long quadrangular shape as a whole. The first mover 11 and the second mover 12 are arranged side by side in the X direction on the first frame 21 and the second frame 22 of the frame body 20. Rectangular openings 212 and 222 are formed in each of the two plates of the frame body 20 facing each other in the X direction with the first mover 11 and the second mover 12 interposed therebetween.

A rectangular opening 213 is formed in each of the two plates of the first frame 21 facing each other in the Y direction with the first mover 11 interposed therebetween. A long side core rod 215 is bridged in each of the pair of openings 213. The long side core rod 215 extends in the X direction across the opening 213. Each end portion of the long side core rod 215 in the X direction is provided on the outer wall surface at a middle position in the Z direction of the two rectangular plate pieces separated in the X direction with the opening 213 interposed therebetween. A guide groove 219 is provided between the −X direction end portions of two plates of the first frame 21 facing each other in the Y direction and one end of the long side core rod 215.

A rectangular opening 223 is formed in each of the two plates of the second frame 22 facing each other in the Y direction with the second mover 12 interposed therebetween. A long side core rod 225 is bridged in each of the pair of openings 223. The long side core rod 225 extends in the X direction across the opening 223. Each end portion of the long side core rod 225 in the X direction is provided on the outer wall surface at a middle position in the Z direction of the two rectangular plate pieces separated in the X direction with the opening 223 interposed therebetween. A guide groove 229 is provided between the +X direction end portions of two plates of the second frame 22 facing each other in the Y direction and one end of the long side core rod 225.

A long side edge portion 216 is provided at an edge portion on the rear side of each of the two plates of the first frame 21 facing each other in the Y direction with the first mover 11 interposed therebetween. The claw portion 217 protrudes from one of the long side edge portions 216 toward the rear side. A long side edge portion 226 is provided at an edge portion on the rear side of each of the two plates of the second frame 22 facing each other in the Y direction with the second mover 12 interposed therebetween. The claw portion 227 protrudes from the long side edge portion 226 on the same side as the long side edge portion 216 toward the rear side.

The sizes in the X direction of the claw portions 217 and 227 in the X direction are slightly larger than the sizes in the X direction of the external connecting terminal portion 815 of the first FPC 81 and the second external connecting terminal portion 825 of the second FPC 82 described later. Each of the end portions of the long side edge portions 216 and 226 in the X direction projects to the outer side of each of the end portions of the plate in the X direction. The protrusion amounts in the Y direction of the long side edge portions 216 and 226 on the side where the claw portions 217 and 227 are located are substantially the same as the protrusion amounts in the Y direction of the long side edge core rods 215 and 225.

Square ring edge portions 218 and 228 are provided on the front side edges of four plates of the first frame 21 and the second frame 22. The protrusion amounts in the Y direction of the square ring edge portions 218 and 228 are larger than the protrusion amounts of the long side core rods 215 and 225. Further, the protrusion amounts in the Y direction of the long side edge portions 216 and 226 on the side where the claw portions 217 and 227 are located are substantially the same as the protrusion amounts in the Y direction of the square ring edge portions 218 and 228 on the same side.

The first magnet 51 and the first coil 61 play a role in generating the driving force of the first mover 11, and the second magnet 52 and the second coil 62 play a role in generating the driving force of the second mover 12.

A pair of first magnets 51 are provided parallel to each other across the first through hole 111 in the first lens carrier 101. Each of the first magnets 51 is formed by stacking and sticking two magnet pieces 511 and 512 in the Z direction to form a plate shape. A pair of second magnets 52 are provided parallel to each other at positions sandwiching the second through hole 121 in the second lens carrier 102. Each of the second magnets 52 is formed by stacking and sticking two magnet pieces 521 and 522 in the Z direction to form a plate shape. The first magnet 51 and the second magnet 52 are accommodated and fixed in the recess portion 115 of the first lens carrier 101 and the recess portion 125 of the second lens carrier 102.

Figure 4:
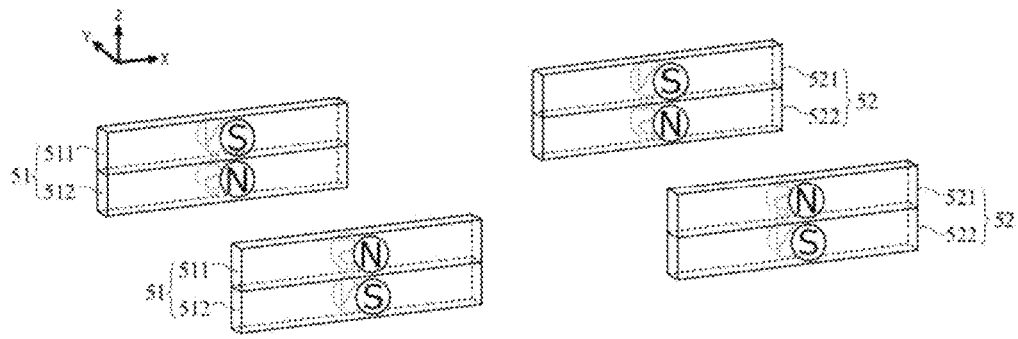
FIG. 4 is a diagram in which magnetic poles are marked on plate surfaces of the first magnets and the second magnets that are shown in FIG. 3.

The magnet pieces 511 and 512 of the first magnet 51, and the magnet pieces 521 and 522 of the second magnet 52 are respectively magnetized in the plate surface direction, and the magnetization orientations in the plate surface direction are reversed on a front side and a rear side in the Z direction. That is, the magnetization orientations of the magnet pieces 511 and 512 are reverse to each other, and the magnetization orientations of the magnet pieces 521 and 522 are reverse to each other. More specifically, as shown in FIG. 4, in each of the pair of first magnet 51, the magnet piece 511 on the front side has its inner plate surface magnetized to the S pole and its outer plate surface magnetized to the N pole, respectively, and the magnet piece 512 on the rear side has its inner plate surface magnetized to the N pole and its outer plate surface magnetized to the S pole, respectively. In each of the pair of second magnet 52, the magnet piece 521 on the front side has its inner plate surface magnetized to the S pole and its outer plate surface magnetized to the N pole, respectively, and the magnet piece 522 on the rear side has its inner plate surface magnetized to the N pole and its outer plate surface magnetized to the S pole, respectively. Further, in this way, it is desirable that the same magnetic poles of the two magnet pieces 511 and 511, the two magnet pieces 512 and 512, the two magnet pieces 521 and 521, and the two magnet pieces 522 and 522 are opposed. It is to be noted that the first magnet 51 and the second magnet 52 may be formed by magnetizing a single plate-shaped magnet as described above.

The first coil 61 and the second coil 62 have linear portions extending in the X direction and semicircular portions connecting the linear portions. The first coils 61 are wound and fixed on two long side core rods 215 of the frame body 20, and the second coils 62 are wound and fixed on two long side core rods 225 of the frame body 20.

A first position detecting magnet 591 is accommodated in one of the recess portions 113 of the plate between the pair of first magnets 51 of the first lens carrier 101 and on the side opposite to the side where the second mover 12 is located. A second position detecting magnet is accommodated in one of the recess portions 223 of the plate between the pair of second magnets 52 of the second lens carrier 102 and on the side opposite to the side where the first mover 11 is located.

The first mover 11 and the second mover 12 are movably supported by a pair of the first front side plate spring 31 and the first rear side spring 41, and a pair of the second front side plate spring 32 and the second rear side spring 42. The first front side plate spring 31, the first rear side plate spring 41, the second front side plate spring 32, and the second rear side plate spring 42 respectively have an outer portion fixed to the frame body 20, an inner portion fixed to the first lens carrier 101 or the second lens carrier 102, and four arm portions extending from one corner of the outer portion toward the inner portion.

The four corner portions on the outer portions of the first front side plate spring 31 and the second front side plate spring 32 are fixed to four corner portions on the front side surfaces of the first frame 21 and the second frame 22, and the four corner portions on the outer portions of the first rear side plate spring 41 and the second rear side plate spring 42 are fixed to four corner portions on the rear side surfaces of the first frame 21 and the second frame 22. The inner portions of the first front side plate spring 31 and the second front side plate spring 32 are fixed to the front side surfaces of the first lens carrier 101 and the second lens carrier 102, and the inner portions of the first rear side plate spring 41 and the second rear side plate spring 42 are fixed to the rear side surfaces of the first lens carrier 101 and the second lens carrier 102.

The first coils 61 face the first magnets 51 of the first mover 11 in parallel with a slight gap. Further, the second coils 62 face the second magnets 52 of the second mover 12 in parallel with a slight gap. Further, at this time, the end surfaces on one side of the two first magnets 51 face the +X direction, that is, the second mover 12. The end surfaces of the second magnets 52 face the second mover 12.

Figure 3:
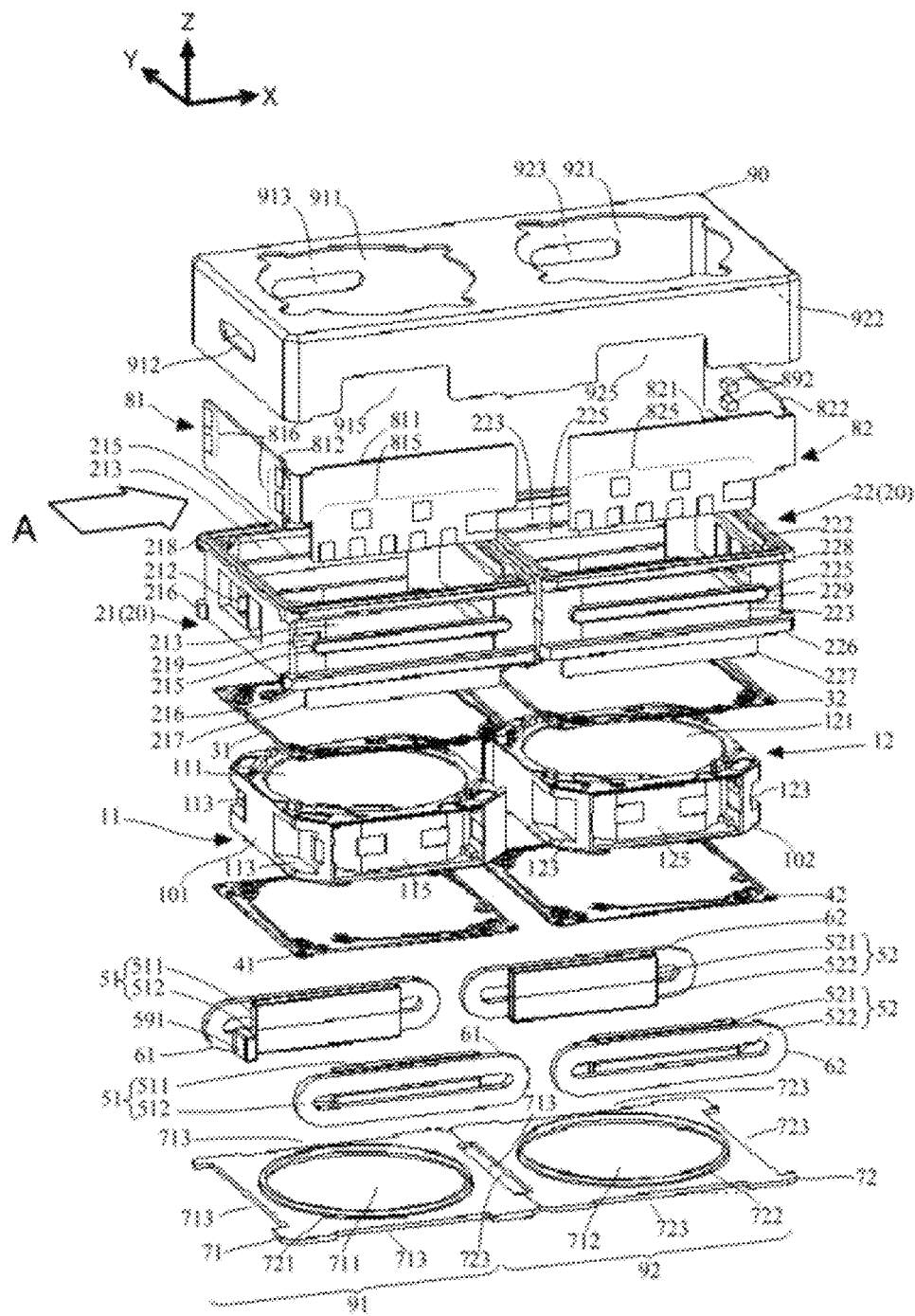
FIG. 3 is an exploded perspective view of the lens driving device shown in FIG. 1.

The first FPC 81 and the second FPC 82 serve to supply an electric current supplied from the substrate of the smartphone 6 to the first coil 61, the second coil 62, and the image sensor. As shown in FIG. 3, the first FPC 81 has a first surface portion 811 and a second surface portion 812, and the second FPC 82 has a third surface portion 821 and a fourth surface portion 822. The first surface portion 811 and the second surface portion 812 intersect at their end portions in such a manner that the outline viewed from the Z direction forms an L-shape. Also, the third surface portion 821 and the fourth surface portion 822 intersect at their end portions in such a manner that the outline viewed from the Z direction forms an L-shape.

Figure 7A:
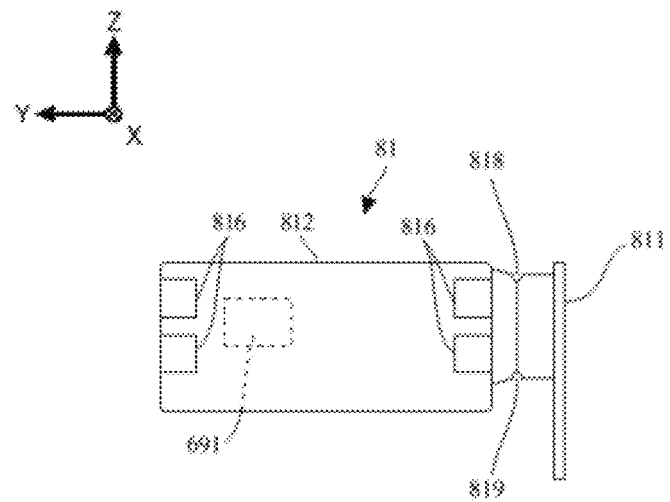
FIG. 7A is a diagram of the first FPC shown in FIG. 3 viewed from the direction of arrow A.

On the rear side of one of the pair of first coils 61, an external connecting terminal portion 815 of the first FPC81 is provided so as to face the claw portion 217 from outside. The first surface portion 811 of the first FPC81 rises forward from the external connecting terminal portion 815, and covers the outside of the one of the first coils 61. The second surface portion 812 extends from the first surface portion 811 in a right angle direction (Y direction), and covers the outside of the first frame 21 corresponding to the short side of the long quadrangular shape of the frame body 20. As shown in FIG. 7A, the front end portion and the rear end portion of the boundary portion between the first surface portion 811 and the second surface portion 812 are provided with notches 818 and 819. Coil connecting terminals 816 are disposed on the outer peripheral surface side of the second surface portion 812. The coil connecting terminals 816 are arranged two by two in the Z direction at the end portions of the second surface portion 812 on the side near each of the first coils 61.

On the rear side of one of the pair of second coils 62, a second external connecting terminal 825 of the second FPC82 is provided so as to face the claw portion 227 from outside. The third surface portion 821 of the second FPC82 rises forward from the second external connecting terminal portion 825, and covers the outside of the one of the second coils 62. The fourth surface portion 822 extends from the third surface portion 821 in a right angle direction (Y direction), and covers the outside of the second frame 22 corresponding to the short side of the long quadrangular shape of the frame body 20. The front end portion and the rear end portion of the boundary portion between the third surface portion 821 and the fourth surface portion 822 are provided with notches. Second coil connecting terminals are disposed on the outer peripheral surface side of the fourth surface portion 822. The coil connecting terminals are arranged two by two in the Z direction at the end portions of the second surface portion 822 on the side near each of the second coils 62.

The external connecting terminal portion 815 and the second external connecting terminal portion 825 are provided with a plurality of terminals that are electrically connected to the substrate of the smartphone 6. The external connecting terminal portion 815 of the first FPC81 and the second external connecting terminal portion 825 of the second FPC82 are arranged in series in the X direction. Thereby, the wiring of the smartphone 6 on the substrate side becomes easier.

Figure 2:
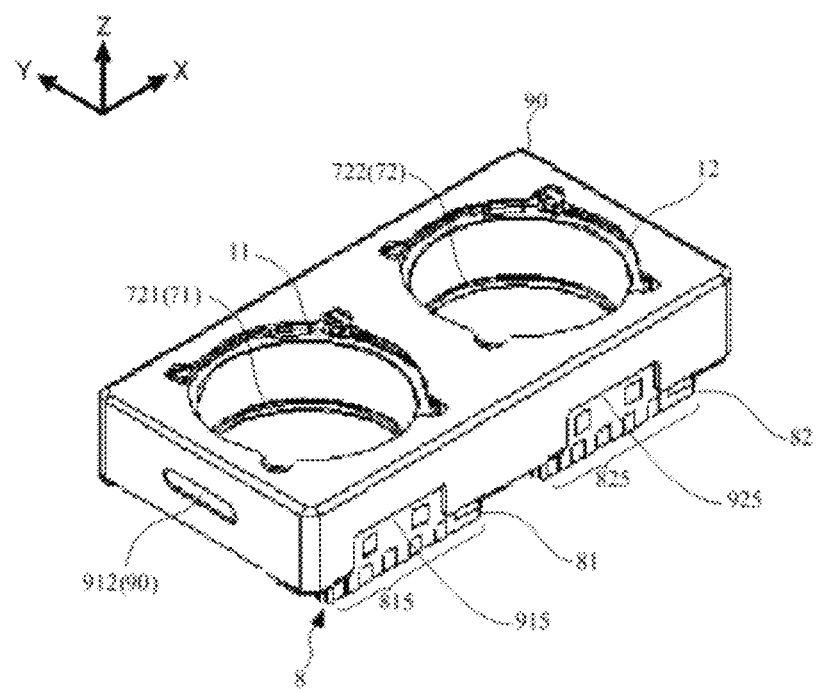
FIG. 2 is a perspective view of the lens driving device shown in FIG. 1.
Figure 5:
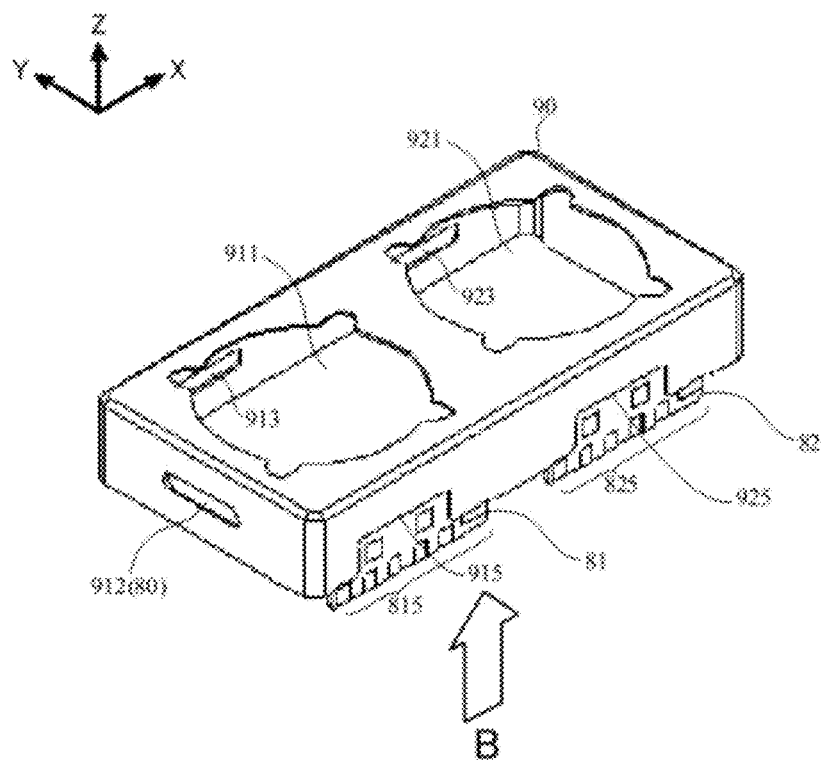
FIG. 5 is a perspective view of a cover, a first FPC, and a second FPC of the lens driving device shown in FIG. 1.
Figure 6:
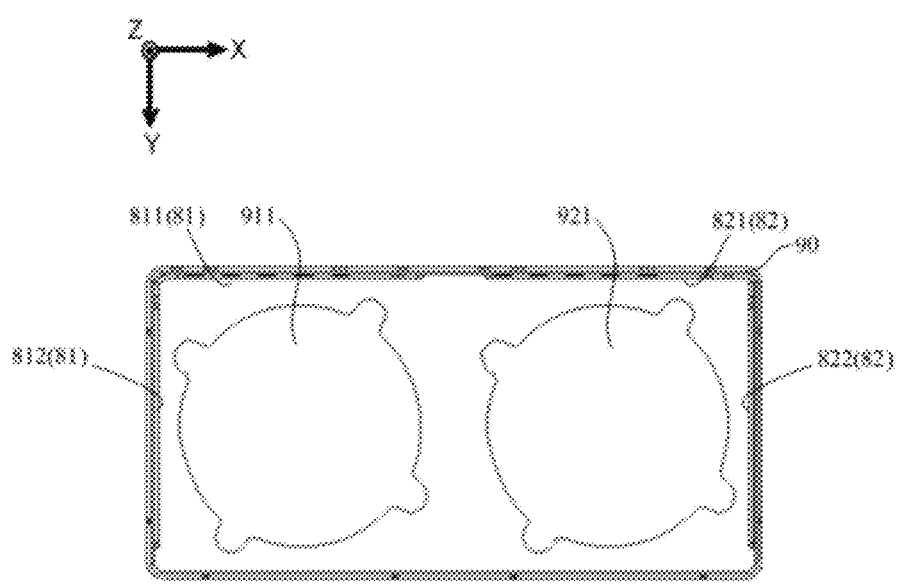
FIG. 6 is a diagram of FIG. 5 viewed from the direction of arrow B.

As shown in FIG. 2 and FIG. 5, the external connecting terminal portion 815 of the first FPC81 and the second external connecting terminal portion 825 of the second FPC82 are exposed on the outer peripheral surface side from the recess portions 915 and 925 of the cover 90. As shown in FIG. 6, the outer periphery surfaces of the first surface portion 811 and the second surface portion 812 of the first FPC81, and the outer periphery surfaces of the third surface portion 821 and the fourth surface portion 822 of the second FPC82 are arranged along the inner periphery surface of the cover 90.

Figure 7B:
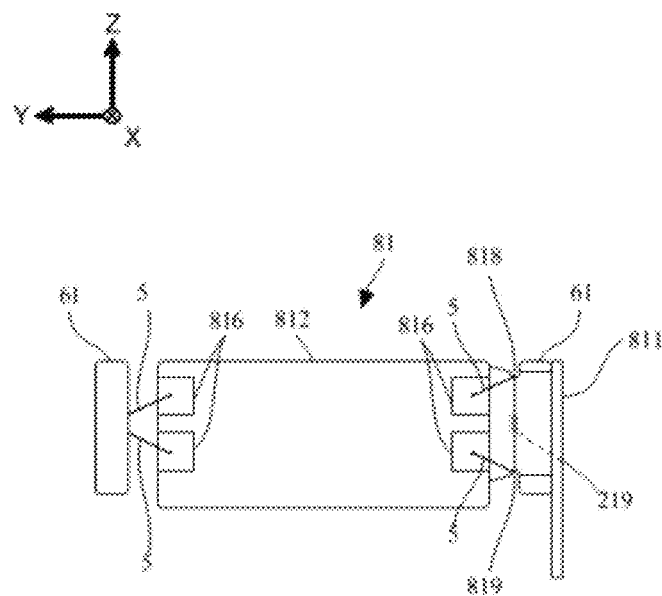
FIG. 7B is a diagram showing the arrangement of lead wires from a pair of first coils to a coil connecting terminal in the first FPC.

As shown in FIG. 7B, the lead wires 5 of one first coil 61 of the pair of first coils 61 on the side where the first surface portion 811 is located pass through the guide groove 219 of the frame body 20, extend beyond the notches 818 and 819, and are drawn out to the outer peripheral surface side and joined to the coil connecting terminals 816. The lead wires 5 of the other first coil 61 of the pair of first coils 61 on the other side opposite to the side where the first surface portion 811 is located extend beyond the end portion of the second surface portion 812 on the side of the other first coil 61, and are drawn out to the outer peripheral surface side and joined to the coil connecting terminals 816. Similarly, the lead wires 5 of one second coil 62 of the pair of second coils 62 on the side where the third surface portion 821 is located pass through the guide groove 229 of the frame body 20, extend beyond the notches, and are drawn out to the outer peripheral surface side and joined to the second coil connecting terminals. The lead wires 5 of the other second coil 62 of the pair of second coils 62 on the other side opposite to the side where the third surface portion 821 is located extend beyond the end portion of the fourth surface portion 822 on the side of the other second coil 62, and are drawn out to the outer peripheral surface side and joined to the second coil connecting terminals.

In the smartphone 6, when an operation is performed to instruct driving of the first lens body 1 or the second lens body 2, an electric current is supplied from the substrate of the smartphone 6 to the external connecting terminal portion 815 of the first FPC81 or to the second external connecting terminal portion 825 of the second FPC82. The electric current supplied to the external connecting terminal portion 815 of the first FPC81 is supplied from the coil connecting terminals 816 of the first FPC81 to the first coils 61. When an electric current flows through the first coil 61, a driving force in the Z direction is generated in the first coil 61, and the first mover 11 moves in the Z direction together with the first lens body 1. The electric current supplied to the second external connecting terminal portion 825 of the second FPC82 is supplied from the second coil connecting terminals of the second FPC82 to the second coils 62. When an electric current flows through the second coil 62, a driving force in the Z direction is generated in the second coil 62, and the second mover 12 moves in the Z direction together with the second lens body 2.

As shown in FIG. 7A, a first position detecting sensor 691 is fixed at a position facing the first position detecting magnet 591 in the first mover 11 on the inner peripheral surface side of the second surface portion 812 of the first FPC81. With the second surface portion 812 of the first FPC81 covering the outer periphery of the first frame 21, the first position detecting sensor 691 is accommodated in the opening 212 of the first frame 21. Similarly, a second position detecting sensor is fixed at a position facing the second position detecting magnet in the second mover 12 on the inner peripheral surface side of the fourth surface portion 822 of the second FPC82. With the fourth surface portion 822 of the second FPC82 covering the outer periphery of the second frame 22, the second position detecting sensor is accommodated in the opening 222 of the second frame 22.

A magnetic position detecting mechanism detecting the position of the first mover 11 in the frame body 20 is configured by the first position detecting sensor 691 together with the first position detecting magnet 591. A magnetic position detecting mechanism detecting the position of the second mover 12 in the frame body 20 is configured by the second position detecting sensor together with the second position detecting magnet. Specifically, the first position detecting sensor 691 and the second position detecting sensor, for example, use a Hall element to detect the positions of the first mover 11 and the second mover 12 based on the change in the magnetic field by the first position detecting magnet 591 and the second position detecting magnet accompanying the movement of the first mover 11 and the second mover 12, and output a signal indicating the positions.

As shown in FIG. 3, a capacitor 892 is fixed near the second position detecting sensor on the inner peripheral surface side of the fourth surface portion 822 of the second FPC82. Similarly, a capacitor is fixed near the first position detecting sensor 691 on the inner peripheral surface side of the second surface portion 812 of the first FPC81.

The details of the configuration of the present embodiment are described above. According to the present embodiment, the following effects can be obtained. In the present embodiment, the plate-shaped magnet pieces 511 and 512 constituting the first magnet 51, and the plate-shaped magnet pieces 521 and 522 constituting the second magnet 52 are respectively magnetized in the plate surface direction, and the magnetization orientations thereof are reversed between the front side and the rear side in the Z direction. Thus, the range of the magnetic force line from the first magnet 51 and the second magnet 52 can be made smaller than the conventional range. In the present embodiment, the end surface of the first magnet 51 of the first mover 11 faces the second mover 12. Thus, the influence on the second mover 12 from the first magnet 51 of the first mover 11 can be reduced, and the influence on the first magnet 51 received from the second mover 12 can also be reduced. For this reason, according to the present embodiment, interference between magnets can be made less likely to occur in the lens driving device 8 employing a configuration in which the two movers arranged side by side are supported on the frame body 20 by the plate springs. Further, in the present embodiment, the end surface of the second magnet 52 of the second mover 12 faces the first mover 11. For this reason, the influence to the first mover 11 from the second magnet 52 of the second mover 12 can be reduced, and the influence to the second magnet 52 received from the first mover 11 can also be reduced. Thus, interference between magnets can be further reduced.

Further, in the present embodiment, the first FPC81 is configured to have an external connecting terminal portion 815 provided on the rear side of one of the two coils 61, a first surface portion 811 rising from the external connecting terminal portion 815 and provided on the outer periphery of one coil 61, and a second surface portion 812 extending from the first surface portion 811 in a right angle direction and provided on the outer periphery of the frame body 20, wherein coil connecting terminals 816 are provided on the outer peripheral surface side of the second surface portion 812. Further, the second FPC82 is configured to have a second external connecting terminal portion 825 provided on the rear side of one of the two coils 62, a third surface portion 821 rising from the second external connecting terminal portion 825 and provided on the outer periphery of one coil 62, and a fourth surface portion 822 extending from the third surface portion 821 in a right angle direction and provided on the outer periphery of the frame body 20, wherein second coil connecting terminals are provided on the outer peripheral surface side of the fourth surface portion 822. With such configuration, the FPC can be configured with two surface portions without requiring three surface portions as in the conventional technology. For this reason, it is possible to provide a lens driving device 8 in which the frame body 20 and the FPC are easily matched and also easily assembled.

It is to be noted that, in the present embodiment, notches may be provided only at the front end portions of the boundary portion between the first surface portion 811 and the second surface portion 812 of the first FPC81 and the boundary portion between the third surface portion 821 and the fourth surface portion 822 of the second FPC82, or notches may be provided only at the rear end portions of the boundary portions. Further, the first FPC81 and the second FPC82 may be formed integrally. Also in this case, since the dimensional accuracy of the first FPC81 and the second PC82 is not affected, the mounting positions of the first coils 61 and the second coils 62 maintain good accuracy.

Further, in the present embodiment, a ferromagnetic body may be provided on the end surface of the first magnet 51 or the second magnet 52. Thereby, the range of the magnetic force line from the end surface of the first magnet 51 or the end surface of the second magnet 52 can be further reduced.

Further, in the present embodiment, the magnetic position detecting mechanism including the position detecting sensor and the position detecting magnets may be replaced by a mechanism using other position detecting elements for detecting the position of the mover, such as a position detecting mechanism using an optical element or a position detecting mechanism using an eddy current.

Further, in the present embodiment, if the end surfaces of the first magnets 51 face the second mover 12, the end surfaces of the second magnets 52 do not need to face the first mover 11. For example, the first lens driving unit 91 may be left as it is, and the second lens driving unit 92 may be rotated 90 degrees. In this case, one second magnet 52 of the pair of the second magnets 52 is disposed so as to be orthogonal to the first magnets 51 on the side close to the first mover 11, and the other second magnet 52 is disposed so as to be orthogonal to the first magnets 51 on the side far from the first mover 11. That is, the plate surfaces of the second magnets 52 face the first mover 11. Also in this case, one end surface of each of the two first magnets 51 faces the second mover 12 side, and faces both end surfaces of one second magnet 52 at an angle of 90 degrees. Therefore, the first magnet 51 and the second magnet 52 hardly affect each other, and are hardly affected by the other.

In this case, the second FPC82 only needs to have the second external connecting terminal portion 825 and the third surface portion 821, and it is not necessary to provide the fourth surface portion 822. The second coil connecting terminals are provided at both ends of the third surface portion 821. The second external connecting terminal portion 825 is arranged in series with the first external connecting terminal portions 825. The first position detecting sensor 691 is desirably provided on the second surface portion 812 away from the second magnet 52, and the second position detecting sensor is desirably provided on the third surface portion 821.

Further, the second magnet 52 of the second lens driving unit 92 may be provided on the second mover 12 at a position corresponding to each side or each corner portion of the quadrangular second frame 22.

What is claimed is:
1. A lens driving device comprising:
   a first mover which is provided with a first through hole for accommodating a first lens body with an optical axis in a Z direction, and comprises a pair of first plate-like magnets arranged parallel to each other at positions across the first through hole;
   a second mover which is provided with a second through hole for accommodating a second lens body with an optical axis in the Z direction, and comprises a pair of second plate-like magnets arranged parallel to each other at positions across the second through hole; and
   plate springs respectively supporting the first mover and the second mover movably in the Z direction, the first mover and the second mover being arranged side by side in a direction orthogonal to the Z direction, wherein the pair of first plate-like magnets constitute a first magnet and the pair of second plate-like magnets constitute a second magnet, and the first magnet and the second magnet are arranged in such a manner that no interference occurs therebetween by being magnetized in the plate surface direction, respectively, magnetization orientations thereof being reversed between a front side and a rear side in the Z direction, wherein the first magnet has an end surface facing the second mover and no magnets other than the first magnet and the second magnet are arranged across a region including both the first through hole and the second through hole.

2. The lens driving device according to claim 1, wherein each of the magnets in the pair of second plate-like magnets have an end surface facing the first mover.

3. The lens driving device according to claim 1, wherein one of the magnets in the pair of second plate-like magnets has a plate surface facing the first mover.

4. The lens driving device according to claim 3, wherein the first mover comprises a magnetic position detecting device on an opposite side of the second mover between the pair of first plate-like magnets.

5. The lens driving device according to claim 1, wherein the end surfaces of the first magnet are provided with ferromagnetic bodies.

6. A camera device comprising the lens driving device according to claim 1, the first lens body and the second lens body.

7. An electronic apparatus comprising the camera device according to claim 6.

* * * * *